R. J. Gatling,
Girder.
No. 96,793.  Patented Nov. 16, 1869.
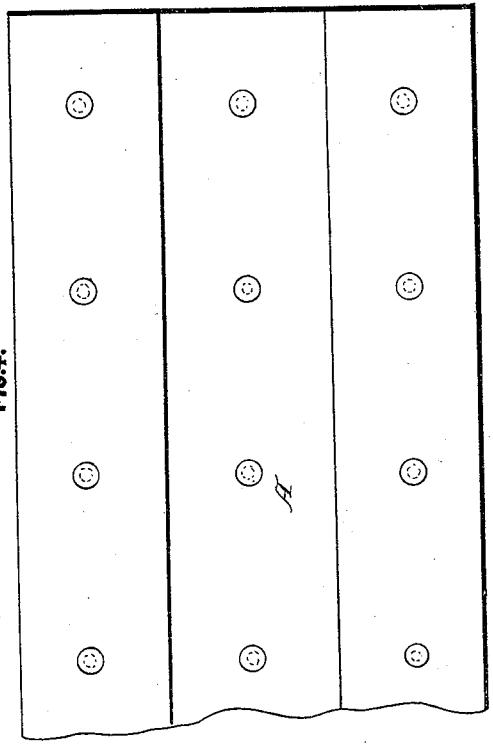
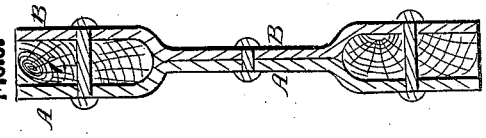
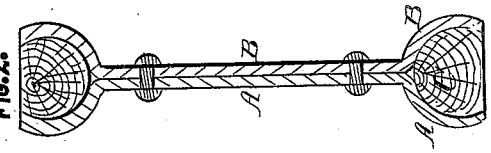
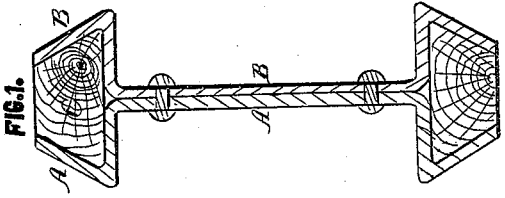

United States Patent Office.

RICHARD J. GATLING, OF INDIANAPOLIS, INDIANA.

Letters Patent No. 96,793, dated November 16, 1869.

IMPROVED BEAM.

The Schedule referred to in these Letters Patent and making part of the same.

*To all whom it may concern:*

Be it known that I, RICHARD J. GATLING, of Indianapolis, in the county of Marion, and State of Indiana, have invented a new and useful Improvement in Beams and Girders; and I do hereby declare that the following is a full, clear, and exact description thereof, which will enable others skilled in the art to make and use the same, reference being had to the accompanying drawing, forming part of this specification, in which—

Figure 1 is a cross-section of a girder, illustrating my invention.

Figures 2 and 3 are cross-sections of slightly-modified forms of the same.

Figure 4 is a side view of a portion of the girder, represented in cross-section in fig. 3.

My invention has for its object to furnish improved girders and beams for fire-proof buildings and other uses, which shall be so constructed that the flooring and laths can be nailed directly to said beams and girders, and which may, at the same time, be constructed with less powerful machinery, and at less expense than when made in the ordinary manner; and It consists in constructing the beams and girders of two iron plates, bolted together, and so formed as to have recesses in their top and bottom edges, for timbers to receive the nails.

A and B are the iron plates of the girders and beams, the central parts or bodies of which are made straight and parallel with each other, and are securely bolted together, as shown in the drawings.

The upper and lower edges of the plates A B are so shaped that when the said plates are bolted together, recesses may be formed in the two edges of the beams and girders, to receive the wooden strips or timbers C, which should be of sufficient size to receive and hold the nails by which the flooring and laths are secured.

The recesses in the edges of the beams and girders may be wider at their bases and narrower at their outer sides, as shown in fig. 1; or they may be made cylindrical in form, as shown in fig. 2; or they may be made deep and narrow, as shown in fig. 3, their particular form being immaterial, so long as they will receive and hold securely timbers of sufficient size to hold the nails.

The timbers C may be secured in place, in the recesses in the edges of the beams and girders, by bolts, if desired or necessary.

Having thus described my invention,

I claim as new, and desire to secure by Letters Patent—

An improved beam or girder, formed of two iron plates, bolted to each other, and so shaped as to form recesses in one or both edges, to receive timbers, substantially as herein shown and described, and for the purpose set forth.

RICHARD J. GATLING.

Witnesses:
  HORACE LORD,
  C. B. RICHARDS.